(12) United States Patent
Chang (10) Patent No.: US 12,375,792 B2
(45) Date of Patent: Jul. 29, 2025

(54) DETECTION SYSTEM USED IN PRODUCT QUALITY DETECTION

(71) Applicant: HON HAI PRECISION INDUSTRY CO., LTD., New Taipei (TW)

(72) Inventor: Chia-En Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 79 days.

(21) Appl. No.: 18/120,937

(22) Filed: Mar. 13, 2023

(65) Prior Publication Data

US 2023/0388618 A1   Nov. 30, 2023

(30) Foreign Application Priority Data

May 24, 2022 (CN) .......................... 202210570651.9

(51) Int. Cl.
  *H04N 23/56* (2023.01)
  *G03B 15/05* (2021.01)
  *G06T 7/00* (2017.01)
  *H04N 23/90* (2023.01)

(52) U.S. Cl.
  CPC ............. *H04N 23/56* (2023.01); *G03B 15/05* (2013.01); *G06T 7/0004* (2013.01); *H04N 23/90* (2023.01); *G03B 2215/0567* (2013.01); *G03B 2215/0582* (2013.01)

(58) Field of Classification Search
  CPC ........ H04N 23/56; H04N 23/90; G03B 15/05; G03B 2215/0567; G03B 2215/0582; G06T 7/0004
  USPC .......................................................... 348/92
  See application file for complete search history.

(56) References Cited

U.S. PATENT DOCUMENTS

| | | | |
|---|---|---|---|
| 2002/0014533 A1* | 2/2002 | Zhu | G06K 7/10851 235/472.01 |
| 2019/0277870 A1* | 9/2019 | Kluckner | G06T 7/11 |
| 2020/0005422 A1* | 1/2020 | Subramanian | G06T 7/194 |
| 2021/0299879 A1* | 9/2021 | Pinter | B25J 9/1697 |

FOREIGN PATENT DOCUMENTS

| | | | |
|---|---|---|---|
| CN | 108454981 A | | 8/2018 |
| CN | 209764743 U | | 12/2019 |
| CN | 114674759 A | * | 6/2022 |

(Continued)

OTHER PUBLICATIONS

JP2023143181 Spec (Year: 2022).*

*Primary Examiner* — Heather R Jones
(74) *Attorney, Agent, or Firm* — ScienBiziP, P.C.

(57) ABSTRACT

A detection system determines to-be-tested products to be qualified or not. The detection system includes a first detection module, a sensing module, and a control module. The first detection module includes a first photographing apparatus and a first light source. The first light source being a plane light source emits light and illuminates the to-be-tested product while the first photographing apparatus captures an image of the to-be-tested product. The control module controls the first light source to emit light and control the first photographing apparatus to capture the image of the to-be-tested product when receiving the sensing signal generated by the sensing module. The control module further analyzes the captured image for determining the to-be-tested product to be qualified or not.

12 Claims, 12 Drawing Sheets

(56) References Cited

FOREIGN PATENT DOCUMENTS

| | | | | |
|---|---|---|---|---|
| CN | 115267046 A | * | 11/2022 | ............. G01N 21/84 |
| JP | 2023143177 A | * | 10/2023 | |
| JP | 2023143181 A | * | 10/2023 | |
| WO | WO-2019058533 A1 | * | 3/2019 | |

* cited by examiner

DETECTION SYSTEM USED IN PRODUCT QUALITY DETECTION

FIELD

The subject matter herein generally relates to product quality detection.

BACKGROUND

Products are manufactured by different processes. After each process, a quality of each product needs to be detected, thus the detection operation is used for assessing the processed product to be qualified or not. An apparatus for detecting the product acquires information of the to-be-tested product, such as shapes or structures, from a captured image of the to-be-tested product. The apparatus provides an annular light source for illuminating the to-be-tested product and takes an image of the to-be-tested product under the annular light source. Due to an illumination range of the annular light source being limited, a brightness on different positions of the to-be-tested product is no-uniformity. When a shooting angle changes, the brightness on different positions of the to-be-tested product in the captured image is changed too. While an analysis process of the image captures a highlight position of the image for analyzing. Thus, when the shooting angle changes, the highlight position of the image is shifted. Under the apparatus using the annular light source, the shooting angle in the apparatus is high. The captured image of the to-be-tested product under a specified shooting angle can be used for the analysis process, the information of the image can be acquired correctly. When the shooting angle is shifted, the captured image is unable to acquire the correct information of the to-be-tested product. There is room for improvement in the art.

BRIEF DESCRIPTION OF THE DRAWINGS

Implementations of the present disclosure will now be described, by way of example only, with reference to the attached figures.

DETAILED DESCRIPTION

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present application provides a detection system for determining to-be-tested products to be qualified or not. In one embodiment, the to-be-tested product may be a plastic bottle with at least one label. The detection system determines that whether an opening of the bottle and the at least one label meet with manufacture requirement. In one embodiment, the detection system captures images of the opening of the bottle and the at least one label for determining the opening of the bottle and the at least one label to be qualified or not.

For manufacturing the mass products, a production line provides a transfer apparatus for transferring the to-be-tested product from a first processing station to a second processing station. In one embodiment, the detection system used in the production line is disposed on a side of the transfer apparatus. While transferring, the transfer apparatus transfers the to-be-tested products, but the position of the detection system is fixed, and the detection system detects the passing to-be-tested products in order.

Figure 1:
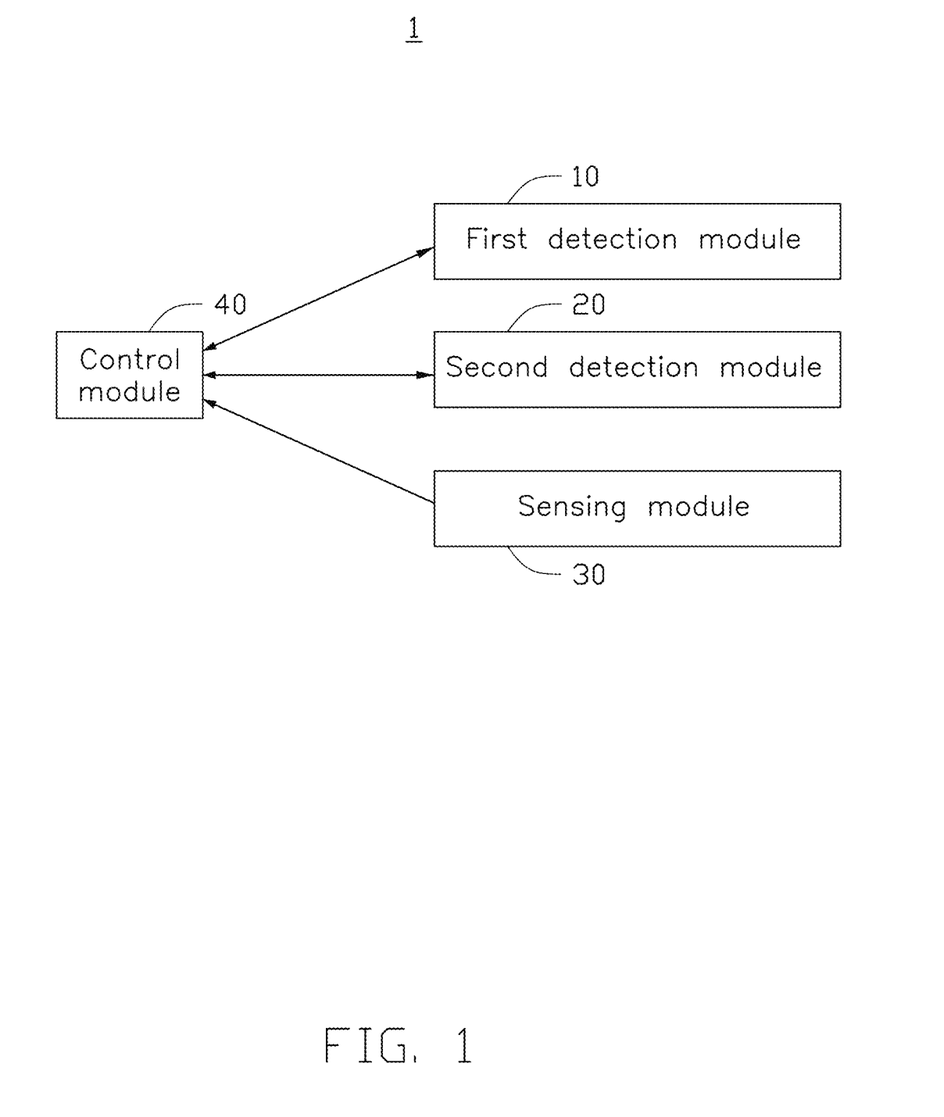
FIG. 1 is a diagram illustrating an embodiment of a detection system according to the present disclosure.

FIG. 1 shows a detection system 1. The detection system 1 includes a first detection module 10, a second detection module 20, a sensing module 30, and a control module 40. The control module 40 are communicated and connected with the first detection module 10, the second detection module 20, and the sensing module 30.

Figure 2:
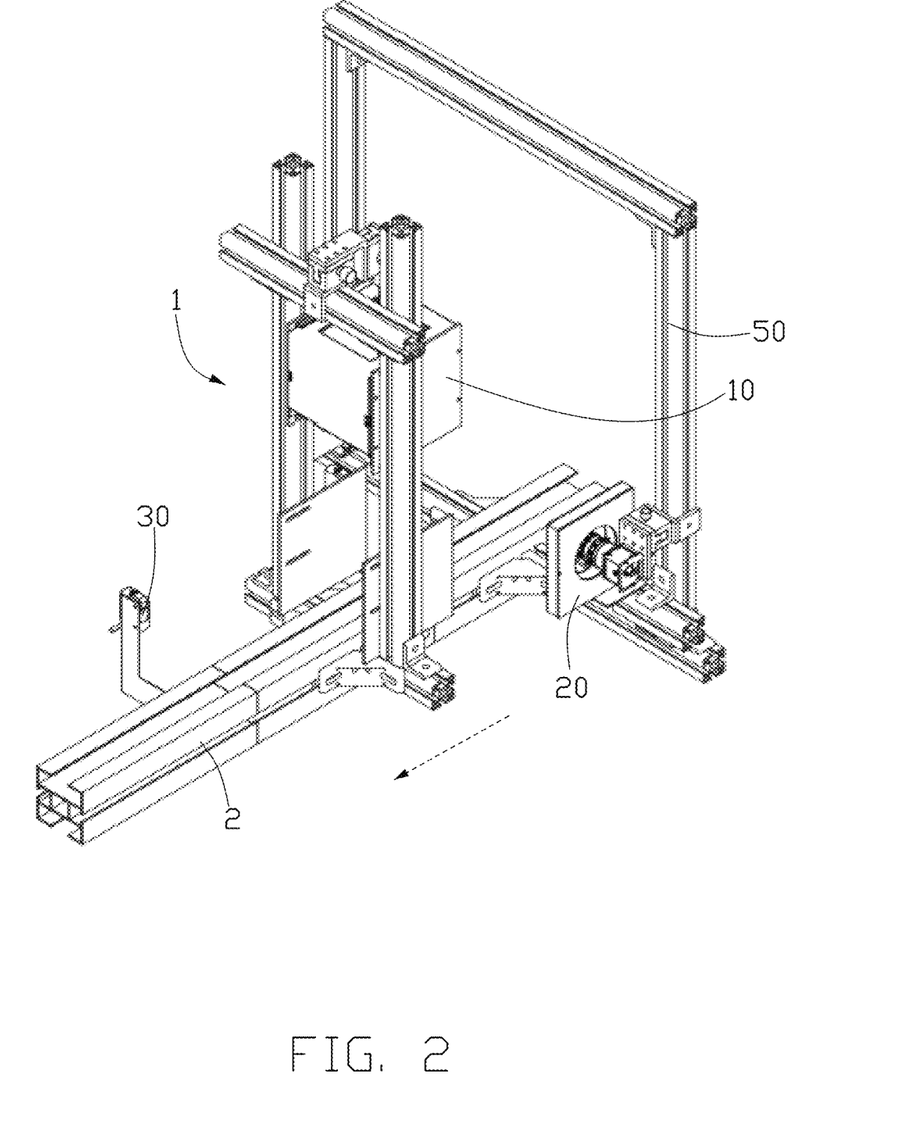
FIG. 2 is a diagram illustrating a first embodiment of the detection system of FIG. 1 according to the present disclosure, the detection system includes a first detection module.

FIG. 2 further shows the structure of the detection system 1. In one embodiment, the detection system 1 further includes a major support 50. The major support 50 is made of rigid and electrical insulation material, and supports the first detection module 10, the second detection module 20, and the sensing module 30. The major support 50 further fixes and remains the relative positions of the first detection module 10, the second detection module 20, and the sensing module 30.

Figure 3:
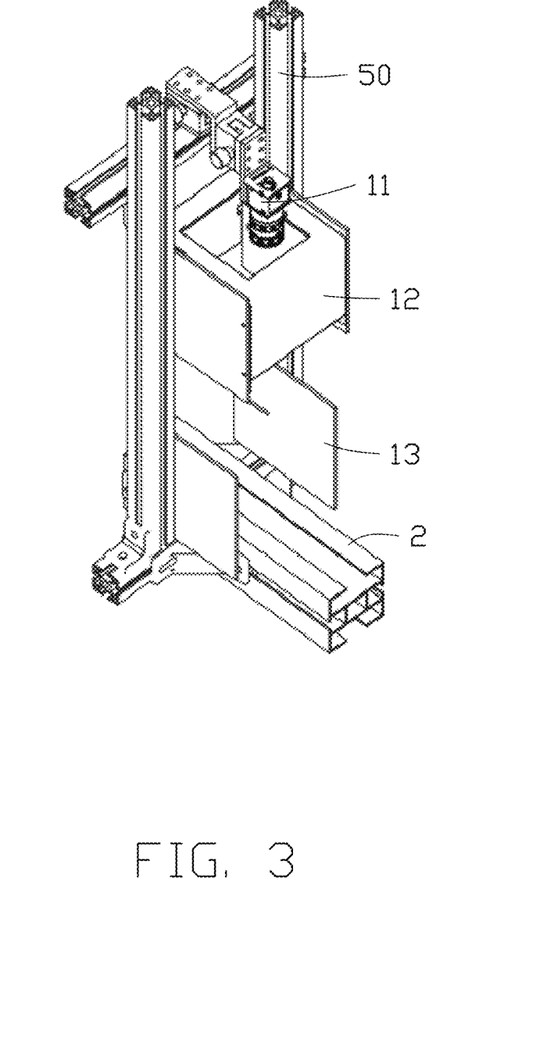
FIG. 3 is a diagram illustrating an embodiment of the first detection module of FIG. 2 according to the present disclosure, the first detection system includes a first light source and light emitting plates.

FIG. 3 shows the first detection module 10. The first detection module 10 includes a first photographing apparatus 11 and a first light source 12. In one embodiment, the first photographing apparatus 11 is an industrial camera for capturing images of specified positions of the to-be-tested product (such as the opening). The first light source 12 provides lights while the first photographing apparatus 11 operates for increasing a brightness of a shooting environment. In one embodiment, when the bottle passes the first photographing apparatus 11, the opening faces away from the transfer apparatus 2 and faces to the first photographing apparatus 11, which is convenience for the first photographing apparatus 11 to capture the image.

Figure 4:
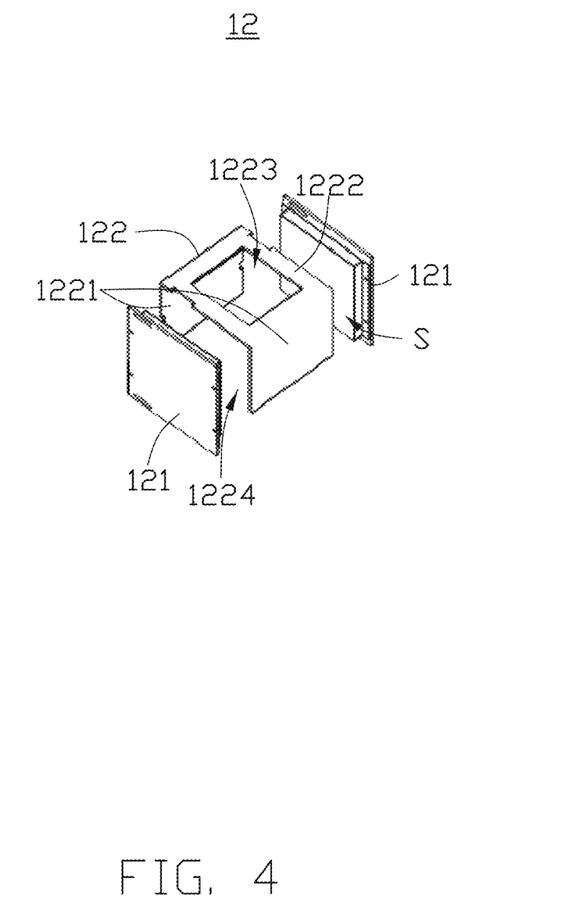
FIG. 4 is a partly exploded diagram illustrating an embodiment of the first light source of FIG. 3 according to the present disclosure.
Figure 5:
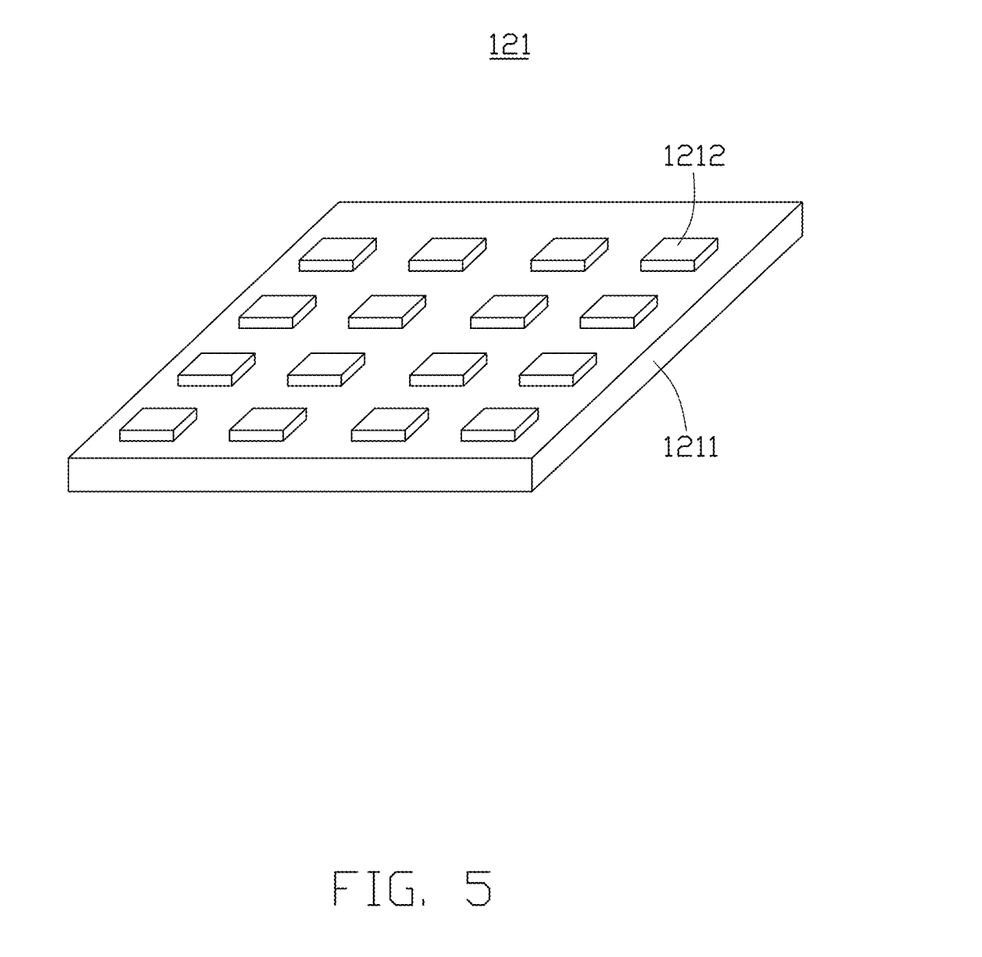
FIG. 5 is a diagram illustrating an embodiment of the light emitting plate according to the present disclosure.

FIG. 4 shows the first light source 12. The first light source 12 includes two light emitting plates 121. As shown in FIG. 5, each light emitting plate 121 includes a substrate 1211 and a plurality of light emitting elements 1212 (such as light emitting diodes) disposed on a same surface of the substrate 1211. The light emitting elements 1212 distance from each to form a matrix. Each light emitting element 1212 emits light along a same direction, and a brightness of the light emitted by each light emitting element 1212 is uniform, thus each light emitting plates 121 serves as a plane light source for emitting light in a uniform brightness.

The first light source 12 further includes a reflector plate 122. The reflector plate 122 includes two reflector portions 1221 and a connection portion 1222 connected between the two reflector portions 1221. The reflector portions 1221 and the connection portion 1222 are integrally formed. Each reflector portion 1221 includes a reflective surface S. The reflective surface S reflects received light. In one embodiment, the reflective surface S also scatter received light. The light emitted by the light emitting plates 121 and the light reflected by the reflective surface S serve as the light to illuminate the to-be-tested product.

In one embodiment, each light emitting plate 121 and each reflector portion 1221 is laminate structure and is substantially in a regular shaped. The connection portion 1222 is laminate structure and defines a through hole 1223. The connection portion 1222 connects with a side of each of two reflector plates 1221 respectively. The two light emitting plates 121 are parallel with each other and are distanced from each other. The reflective surfaces S of the two reflector portions 1221 are opposite. Two opposite sides of each light emitting plate 121 are connected with the two reflector portions 1221 respectively. Two opposite sides of each reflector portion 1221 are connected with two light emitting plates 121. The two light emitting plates 121 and the two reflector portions 1221 form a barrel-shaped structure with a hollow space 1224.

When the light emitting plates 121 emit lights, the emitted light is reflected by the reflector portion 1221 for multiple times. The light in the hollow space 1224 is uniform for illuminating the to-be-tested product. In one embodiment, the light emitting plates 121 are plane light source, and are able to form a shooting environment with a uniform brightness in a larger space. Thus, a shooting effect is improved.

In one embodiment, the reflective surface S of each reflector portion 1221 is perpendicular to a plane of an extended direction of the transfer apparatus 2. The first photographing apparatus 11 is disposed on a side of the connection portion 1222 of the first light source 12 and faces to the through hole 1223 of the connection portion 1222. A projection of the first photographing apparatus 11 on the first light source 12 is disposed in the through hole 1223. Thus, the first photographing apparatus 11 captures the image of the to-be-tested product through the through hole 1223.

Figure 8:
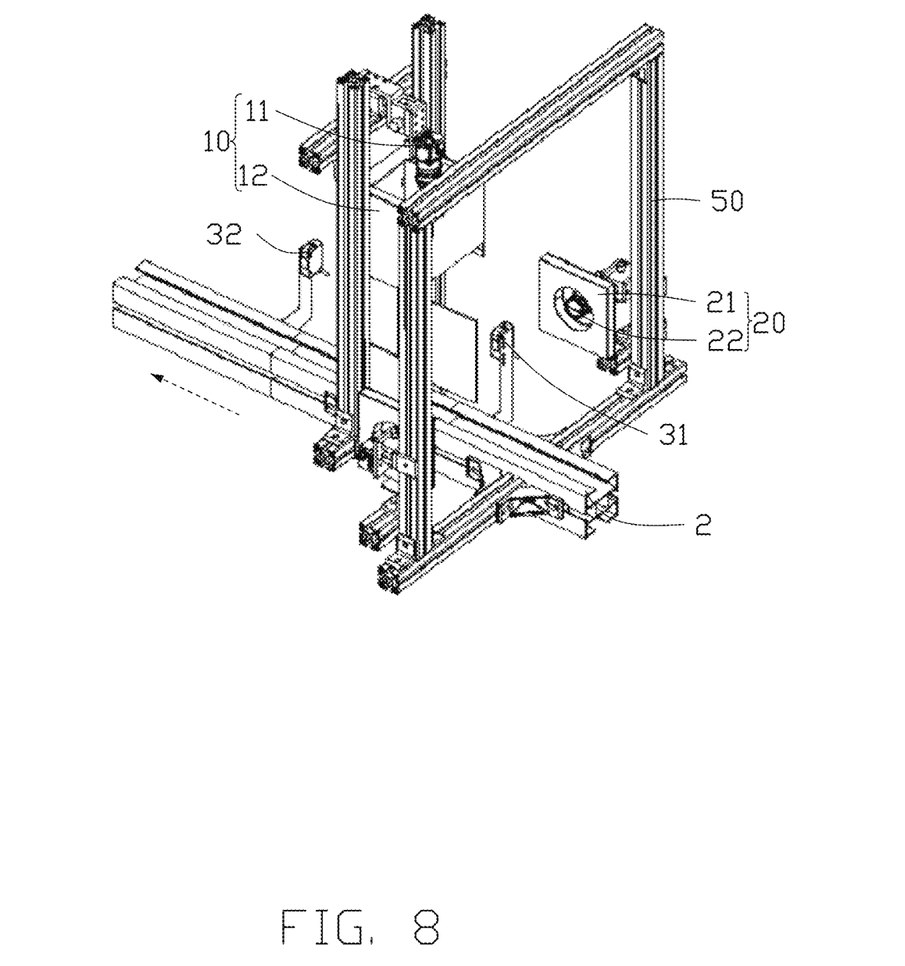
FIG. 8 is a diagram illustrating a fourth embodiment of the detection system of FIG. 1 according to the present disclosure.

In one embodiment, a moving direction of the to-be-tested product on the transfer apparatus 2 is along a direction indicated by a broken line arrow as shown in FIG. 2 or FIG. 8. The moving direction is parallel with the light emitting plate 121 and is perpendicular to the reflector portion 1221. Due to a height of the to-be-tested product, a length of a side of the reflector portion 1221 connected with the light emitting plate 121 is less a length of a side of the light emitting plate 121 connected with the reflector portion 1221. Thus, a distance between the reflector portion 1221 and the transfer apparatus 2 is larger than a distance between the light emitting plates 121 and the transfer apparatus 2. When the to-be-tested product is disposed under the first photographing apparatus 11, the first light source 12 emits uniform light to illuminate the to-be-tested product. The first photographing apparatus 11 captures an image of the opening of the to-be-tested product for achieving a clear shape of the opening.

In one embodiment, the first detection module 10 further includes two light barriers 13. The light barrier 13 is substantially in a flake film shape and is made of light shielding material. The light barriers 13 are parallel with each other and are disposed on opposite sides of the transfer apparatus 2. While the first light source 12 emits light, the light barrier 13 shields external light, thus the to-be-tested product is unable to be illuminated by the external light. Therefore, due to the light barriers 13, the illuminated portions and the brightness of the to-be-tested product is merely related to the first light source 12 without being disturbed by the external light. When the to-be-tested product is transferred under the first photographing apparatus 11, the to-be-tested product is between the light barriers 13, and the external light is blocked by the barriers 13 and is unable to emit into a region between the light barriers 13. A contrast of the image of the opening of the to-be-tested product is increased by comparing with a contrast of the image of other portions of the to-be-tested product, thus it is convenience for capturing a clear shape of the opening. In one embodiment, the external light may be the light emitted by other processing stations on the production line, or environment light, or light emitted by a second detection module 20 (being adjacent to the first detection module 10).

In other embodiments, the first light source 12 includes four light emitting plates 121 without the reflector plates 122. The four light emitting plates 121 connect with each other to form a barrel-shaped structure with the hollow space

1224 as shown in FIG. 2. In this embodiment, all the inner surfaces of the barrel-shaped structure are formed by the light emitting plates 121, the light with uniform brightness may be directly achieved without being reflected by the reflector plates 122 for multiple times. By comparing with the structure with the two light emitting plates 121 and the reflector plates 122, a uniformity of the light is improved. By comparing with the structure with the four light emitting plates 121, a cost of the first light source 125 is decreased.

Figure 6:
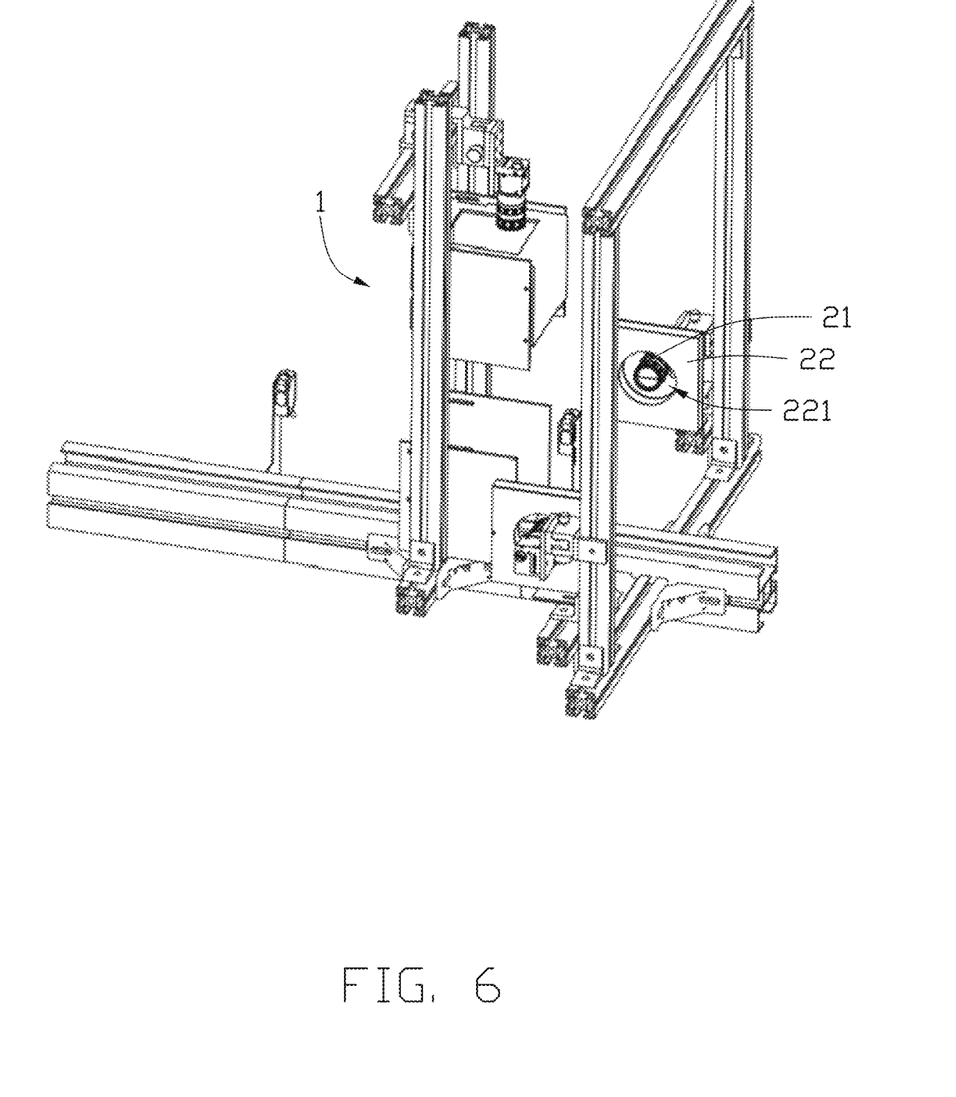
FIG. 6 is a diagram illustrating a second embodiment of the detection system of FIG. 1 according to the present disclosure.

FIG. 6 shows a second embodiment of the detection system 1. The second detection module 20 captures images of the labels on the to-be-tested product. The second detection module includes a second photographing apparatus 21 and a second light source 22. In one embodiment, the is an industrial camera for capturing the images of the labels on the to-be-tested product. The to-be-tested product includes a bottle body connecting between the opening and a bottom of the to-be-tested product. The labels are pasted on the outer surface of the bottle body. When the to-be-tested product is placed on the transfer apparatus 2, the labels face to the second photographing apparatus 21.

The second light source 22 provides lights while the second photographing apparatus 21 operates for increasing a brightness of a shooting environment. The second light source 22 includes a plurality of light emitting elements (not shown, such as light emitting diodes). The light emitting elements distance from each to form a matrix. Each light emitting element emits light along a same direction, and a brightness of the light emitted by each light emitting element is uniform, thus the second light source 22 serves as a plane light source for emitting light in a uniform brightness.

In one embodiment, the second light source 22 is substantially in a plate shape and defines a through hole 221. The second photographing apparatus 21 is disposed on a side of the light source 22 emitted the light. The second photographing apparatus 21 captures the images of the to-be-tested product through the through hole 221.

In one embodiment, the second photographing apparatus 21 and the first photographing apparatus 11 are disposed along the extended direction of the transfer apparatus 2 in that order. The images of the labels and the opening of the to-be-tested product are orderly captured. While the to-be-tested product is firstly transferred under the second photographing apparatus 21, the second photographing apparatus 21 captures the image of the label of to-be-tested product. Then, the to-be-tested product is transferred under the first photographing apparatus 11, and the first photographing apparatus 11 captures the image of the opening of the to-be-tested product. In other embodiments, the positions of the first photographing apparatus 11 and the second photographing apparatus 21 can be exchanged.

Figure 7:
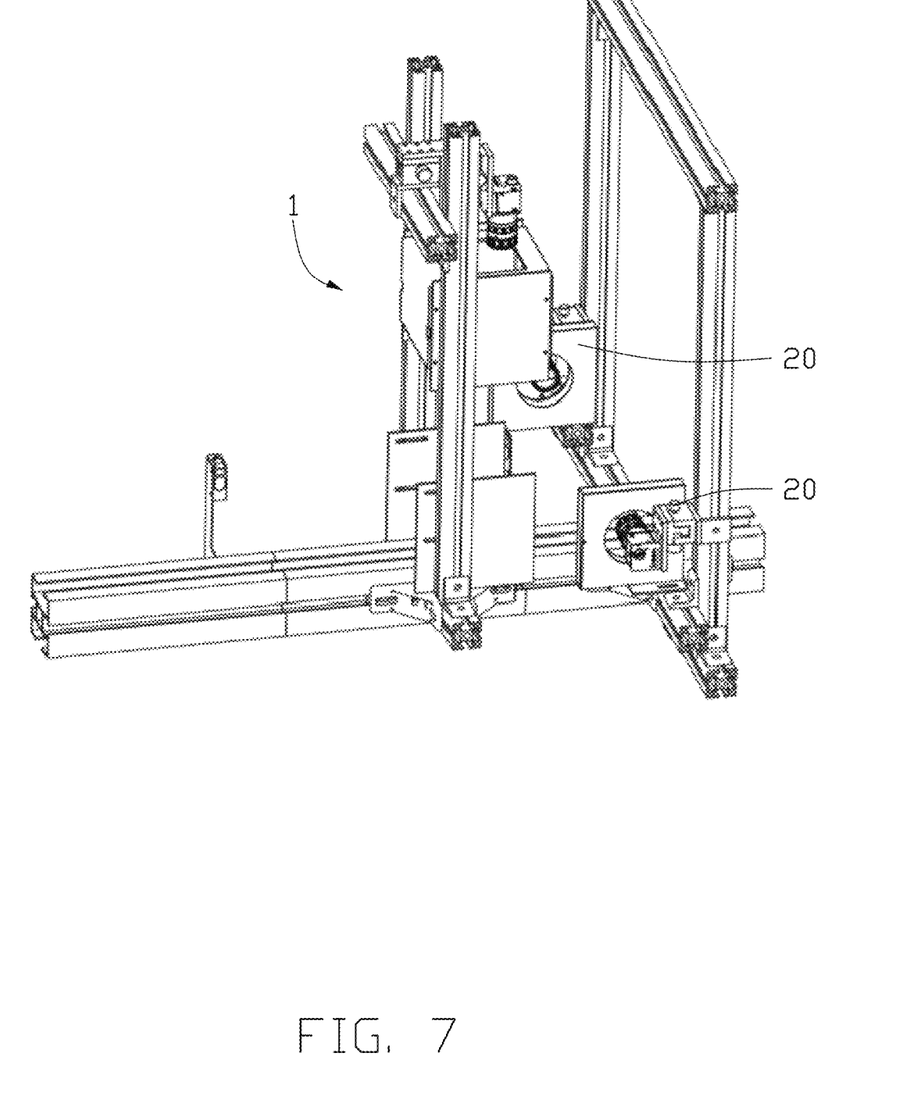
FIG. 7 is a diagram illustrating a third embodiment of the detection system of FIG. 1 according to the present disclosure.

FIG. 7 shows a third embodiment of the detection system 1. In the third embodiment, the to-be-tested product includes several labels. For example, the labels include a front label and a back label. In one embodiment, the detection system 1 includes two second detection modules 20. The second detection modules 20 are disposed on opposite side of the transfer apparatus 2 for capturing the images of the front label and the back label respectively. In other embodiments, the detection system 1 may be include one second detection module 20.

FIG. 8 show a fourth embodiment of the detection system 1. The sensing module 30 includes a first sensor 31 and a second sensor 32. The first sensor 31 and the second sensor 32 are infrared sensors for sensing the to-be-tested product. The first sensor 31 and the second sensor 32 emit infrared light. When the to-be-tested product is transferred under the first sensor 31 or the second sensor 32, the infrared light is reflected by the to-be-tested product. The first sensor 31 or the second sensor 32 receives the reflected infrared light and generates a sensing signal.

In one embodiment, the second detection module 20, the first sensor 31, the first detection module 10, and the second sensor 32 are disposed along the extended direction of the transfer apparatus 2 in that order. In this embodiment, while transferring, the to-be-tested product firstly passes through the second detection module 20, then passes through the first sensor 31, then passes through the first detection module 10, and finally passes through the second sensor 32.

The control module 40 is a computer. The control module 40 may transmit data or signals with the first detection module 10, the second detection module 20, the first sensor 31, and the second sensor 32 in a wired manner or a wireless manner. In one embodiment, the control module 40 connects with the first detection module 10 and the second detection module 20 in a wired manner. The control module 40 controls the first photographing apparatus 11 and the second photographing apparatus 21 to capture the images. The control module 40 also controls the first light source 21 and the second light source 22 to emit light and controls a light brightness of the first light source 21 and the second light source 22. The control module 40 receives the sensing signals from the first sensor 31 and the second sensor 32. The control module 40 further analyzes the captured image to obtain information of the to-be-tested product.

Referring to FIG. 8, the operation of the detection system 1 is described as follow.

The transfer apparatus 2 transfers the to-be-tested product. When the to-be-tested product firstly moves under the second detection module 20, no action occurs in the detection system 1. When the to-be-tested product moves under the first sensor 31, the first sensor 31 generates the sensing signal. The control module 40 receives the sensing signal form the first sensor 31 and determines the to-be-tested product directly facing to the second detection module 20. The control module 40 controls the second light source 22 to emit light and controls the second photographing apparatus 21 to capture an image. Thus, the image of the label is obtained.

Due to a volume of the to-be-tested product, a specified time duration is exited between a time of the to-be-tested product being firstly sensed by the first sensor 31 and a time of the to-be-tested product completely passed through the first sensor 31. Thus, while the time duration of the to-be-tested product being sensed by the first sensor 31, the first sensor 31 keeps generating the sensing signal to the control module 40. When the to-be-tested product completely passes through the first sensor 31, the first sensor 31 stops generating the sensing signal. The control module 40 fails to receive the sensing signal from the first sensor 31. In other words, when the to-be-tested product arrives the first sensor 31 (entering a sensing range of the first sensor 31), the first sensor 31 starts to generate the sensing signal, and when the to-be-tested product completely passes through the first sensor 31 (being out of the sensing range of the first sensor 31), the first sensor 31 stops generating the sensing signal. The control module 40 determines the position of the to-be-tested product due to the sensing signal. Therefore, the control module 40 controls the first light source 40 to emit light and controls the first photographing apparatus 11 to capture the image. The image of the opening of the bottle is obtained.

The first photographing apparatus 11 and the second photographing apparatus 21 transmit the captured images to the control module 40. The control module 40 receives the image of the label captured by the first photographing apparatus 11. The control module 40 identifies a language (such as Chinese or English) in the captured image based on shapes of words in the captured image for determining the label to be wrong or right. The control module 40 receives the image of the opening captured by the second photographing apparatus 21. The control module 40 extracts a shape of the opening for determining the shape of the opening to be a specified shape (such as a circle) or not, or determining odds being cut or not, or determining the opening being blocked or not.

When the control module 40 determines that the label is right, the shape of the opening is the specified shape, no odd exists on the opening, and the opening fails to be blocked, the to-be-tested product is determined to be qualified. Otherwise, the to-be-tested product is determined to be unqualified.

While the control module 40 analyzes the image, the to-be-tested product keeps being transferred. The control module 40 obtains a determining result before the to-be-tested product being transferred under the second sensor 32. When the to-be-tested product is transferred under the second sensor 32, the second sensor 32 state to generate the sensing signal. The control module receives the sensing signal generated by the second sensor 32 and determines that the to-be-tested product have completely passed through the first detection module 10.

When the control module 40 determines the to-be-tested product to be qualified by the image of the label, before the control module 40 receives the sensing signal generated by the second sensor 32, no other action is acted, and the to-be-tested product is able to be transferred to a next processing station. When the control module 40 determines the to-be-tested product to be unqualified by the image of the label and receive the sensing signal generated by the second sensor 32, the control module 40 controls a removing structure of the production line to remove the to-be-tested product. The unqualified to-be-tested product is avoided to be transferred to the next processing station. The removing structure may a blowing structure (not shown) being electrically connected with the control module 40. The control module 40 controls the blowing structure to blow the to-be-tested product to be out of the transfer apparatus 2. In other embodiments, the removing structure can be other structures, such as mechanical arms.

Figure 9:
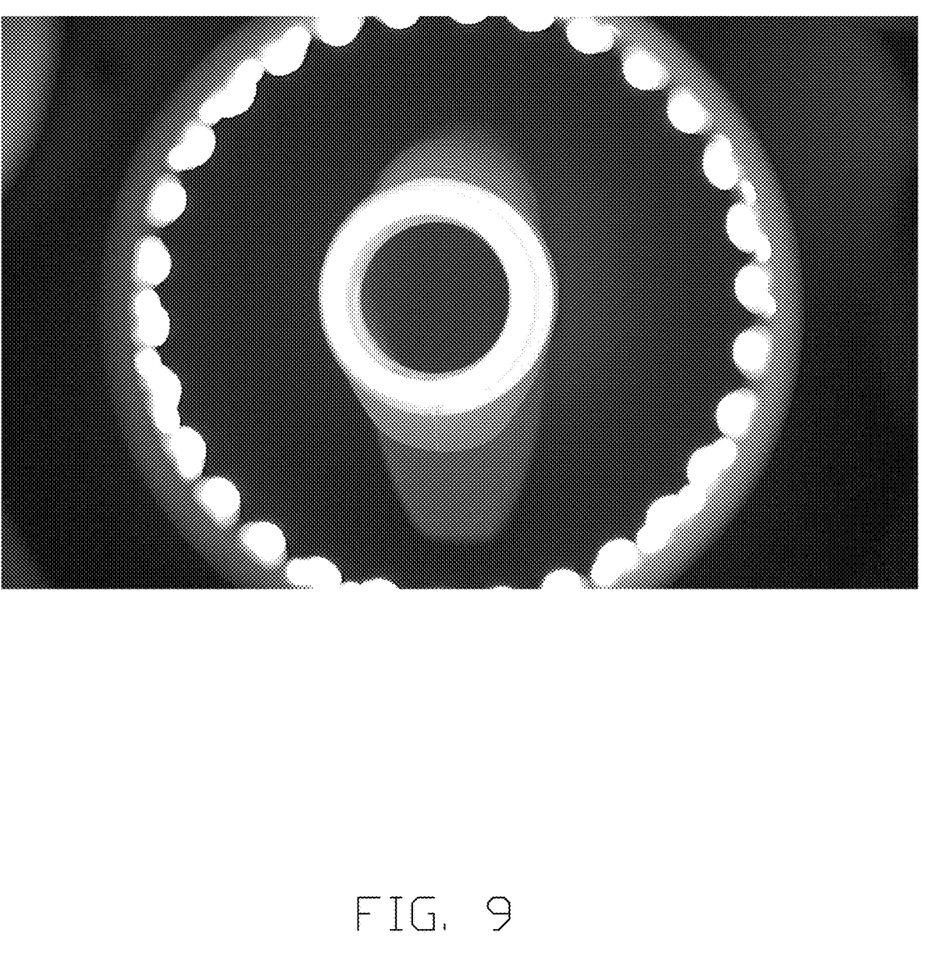
FIG. 9 is a diagram illustrating a comparative embodiment of an image of a to-be-tested product captured by a front-facing photographing apparatus.
Figure 10:
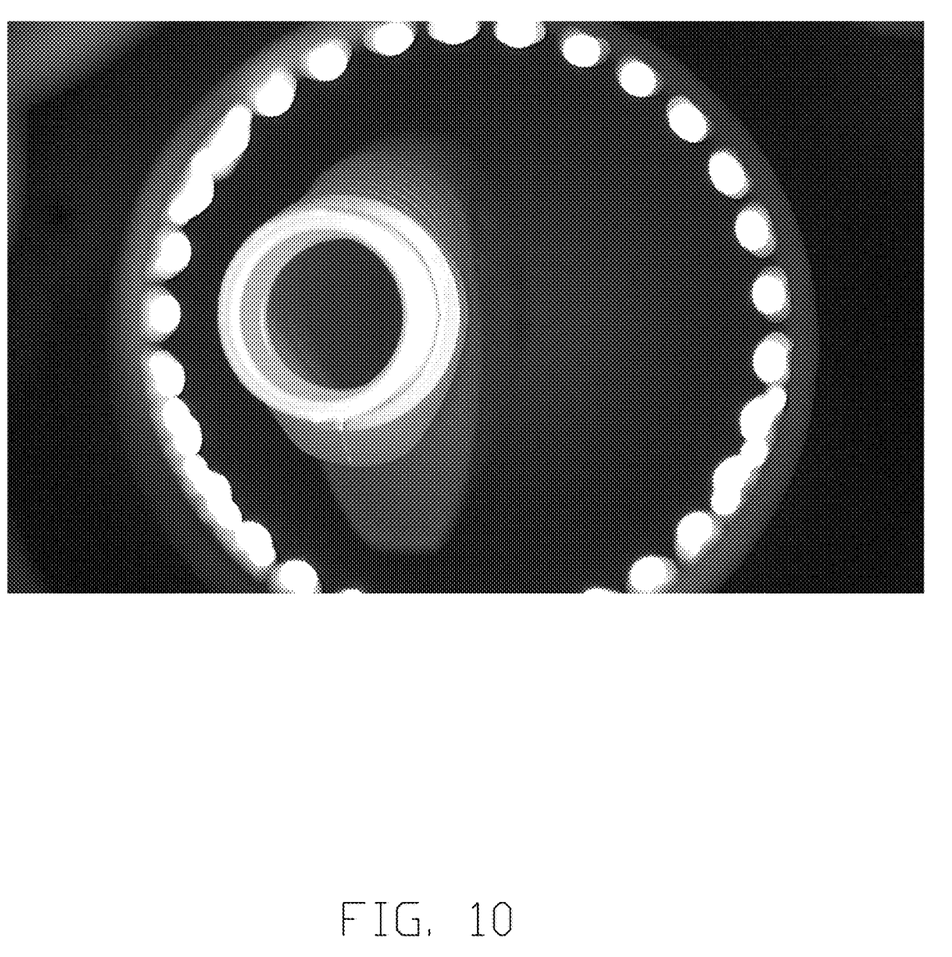
FIG. 10 is a diagram illustrating a comparative embodiment of an image of a to-be-tested product captured by a photographing apparatus under a shifted shooting angle.

FIG. 9 shows a comparative embodiment of an image of a to-be-tested product captured by a front-facing photographing apparatus. FIG. 10 shows a comparative embodiment of an image of a to-be-tested product captured a photographing apparatus under a shifted shooting angle. The control module extracts a highlight portion of the image received by the photographing apparatus and serves as the shape of the opening. Due to an illumination range of the annular light source being limited, when the shooting angle is shifted, the portion of the to-be-tested product being illuminated is changed, and the highlight portion in the image is also changed. In that means, when the shooting angle being shifted, the highlight portion in the captured image includes a part of the opening and a part of the bottle body. When the highlight portion serves as the shape of the opening, a misjudgment of the to-be-tested product may be generated. According to FIG. 10, when the inner side of the to-be-tested product is highlighted, the highlight portion serves as the shape of the opening, and the opening is determined to be blocked.

Figure 11:
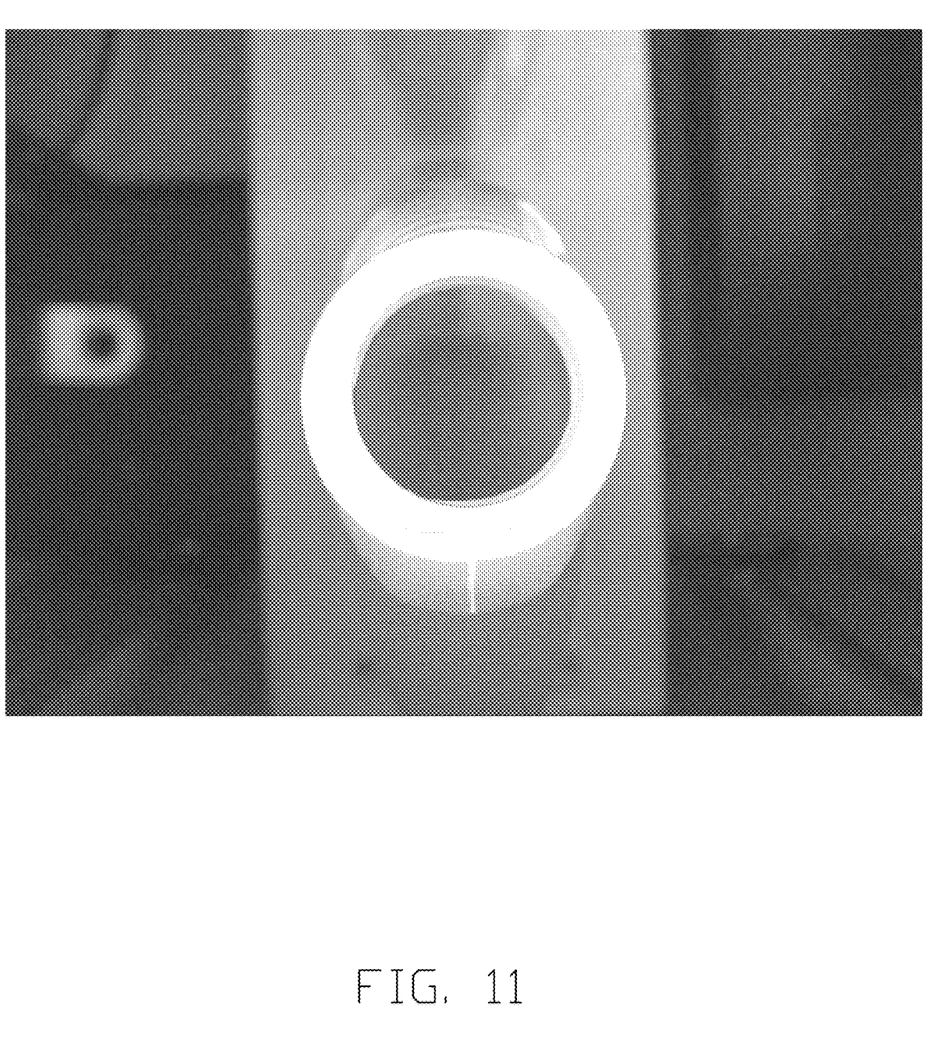
FIG. 11 is a diagram illustrating an embodiment of an image of the to-be-tested product captured by the front-facing first photographing apparatus according to the present disclosure.
Figure 12:
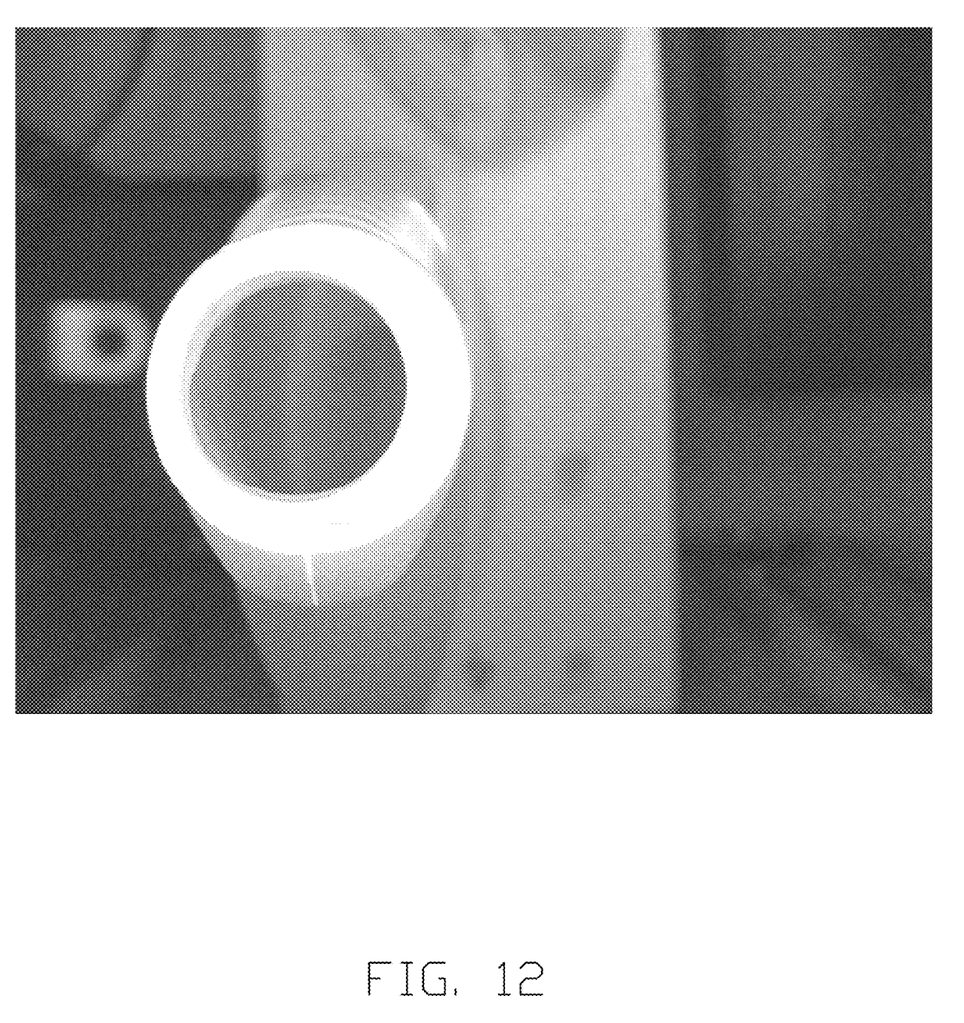
FIG. 12 is a diagram illustrating an embodiment of an image of the to-be-tested product captured by the first photographing apparatus under a shifted shooting angle according to the present disclosure.

FIG. 11 shows an image of the opening of the to-be-tested product captured by the front-facing first photographing apparatus. FIG. 12 shows an image of the opening of the to-be-tested product captured by the front-facing first photographing apparatus under a shifted shooting angle. As shown in FIGS. 11 and 12, due to the first light source 12 is a plane light source, a wide range of a location of the to-be-tested product is illuminated. Even the shooting angle is shifted, the highlight portion in the captured image is still to be the position of the opening. Therefore, the control module 40 may accurately obtain the image of the opening. As shown in FIG. 12, when the shooting angle is shifted, the highlight portion of the image is the opening, and the inner side of the bottle fails to be highlighted, thus the opening fails to be determined to be blocked.

Based on the structure of the detection system 1, the first light source 12 in the first detection module 11 is a plane light source, while the first photographing apparatus 11 in the first detection module 11 captures the images, the brightness of the wide range of the location of the to-be-tested product is uniform. Even the shooting angle is shifted (the first photographing apparatus 11 fails to be directly faced to the to-be-tested product), the image of the to-be-tested product is clear. Therefore, due to the detection system 1, a quality of the image of the opening captured by the first photographing apparatus 11 is improved.

Persons of ordinary skill in the art should realize that the above implementation modes are merely used to describe some embodiments, but are not intended to limit the present disclosure, and any proper changes and variations made to the above embodiments within the spirit and scope of the present disclosure shall fall within the scope of the present disclosure.

What is claimed is:

1. A detection system for determining to-be-tested products to be qualified or not; the detection system comprising:
    a first detection module, comprising a first photographing apparatus and a first light source; the first photographing apparatus configured to capture an image of the to-be-tested product; the first light source being a plane light source configured to emit light and illuminate the to-be-tested product while the first photographing apparatus captures the image of the to-be-tested product;
    a sensing module, configured to generate sensing signal when the to-be-tested product being sensed; and
    a control module, connected with the first photographing apparatus, the first light source, and the sensing module, configured to control the first light source to emit light and control the first photographing apparatus to capture the image of the to-be-tested product when receiving the sensing signal; the control module further configured to analyze the captured image for determining the to-be-tested product to be qualified or not;
    wherein the first light source comprises two light emitting plates and a reflector plate; the reflector plates comprises two reflector portions; the two light emitting plates and the two reflector portions form a barrel-shaped structure with a hollow space; each of the reflector portions is configured to reflect the emitted light from the light emitting plates for multiple times.

2. The detection system of claim 1, wherein each light emitting plate is a plane light source; the light emitting plates are parallel with each other; and light emitting surfaces of the two light emitting plate are opposite; the reflector plate reflects the light emitted by the two light emitting plates.

3. The detection system of claim 2, wherein the reflector plate further scatter the light emitted by the two light emitting plates.

4. The detection system of claim 2, wherein each reflector portion is laminate structure; each reflector portion comprises a reflective surface; the two reflector portions are parallel with each other, and the reflective surfaces of the two reflector portions are opposite.

5. The detection system of claim 4, wherein the reflector plate further comprises a connection portion connected between the two reflector portions; the connection portion defines a through hole; the first photographing apparatus is disposed on a side of the connection portion; the first photographing apparatus captures the image of the to-be-tested product through the through hole.

6. The detection system of claim 1, wherein the first detection module further comprises two light barriers; the light barrier shields external light.

7. The detection system of claim 1, wherein the detection system further comprises a second detection module; the second detection module captures an image of the to-be-tested product; the first detection module and the second detection module capture different portions of the to-be-tested product respectively; the control module analyzes the images captured by the first detection module and the second detection module for determining the to-be-tested product to be qualified or not.

8. The detection system of claim 7, wherein the sensing module comprises a first sensor; when the first sensor senses the to-be-tested product and generates the sensing signal, the control module controls the second detection module to capture the image of the to-be-tested product in response to the sensing signal from the first sensor.

9. The detection system of claim 8, wherein when the first sensor senses the to-be-tested product being completely passed through the first sensor, the first sensor stops generates the sensing signal, and the control module controls the first detection module to capture the image of the to-be-tested product.

10. The detection system of claim 8, wherein the sensing module further comprises a second sensor; when the second sensor senses the to-be-tested product and generates the sensing signal, the control module controls the first detection module to capture the image of the to-be-tested product in response to the sensing signal from the second sensor.

11. The detection system of claim 10, wherein the to-be-tested product is transferred by a transfer apparatus; the second detection module, the first sensor, the first detection module, and the second sensor are disposed along the extended direction of the transfer apparatus in that order.

12. The detection system of claim 7, wherein the second detection module comprises a second photographing apparatus and a second light source; the second light source being a plane light source is substantially in a plate shape and defines a through hole; the second photographing apparatus captures the images of the to-be-tested product through the through hole of the second light source.

* * * * *